No. 735,353.          Patented August 4, 1903.

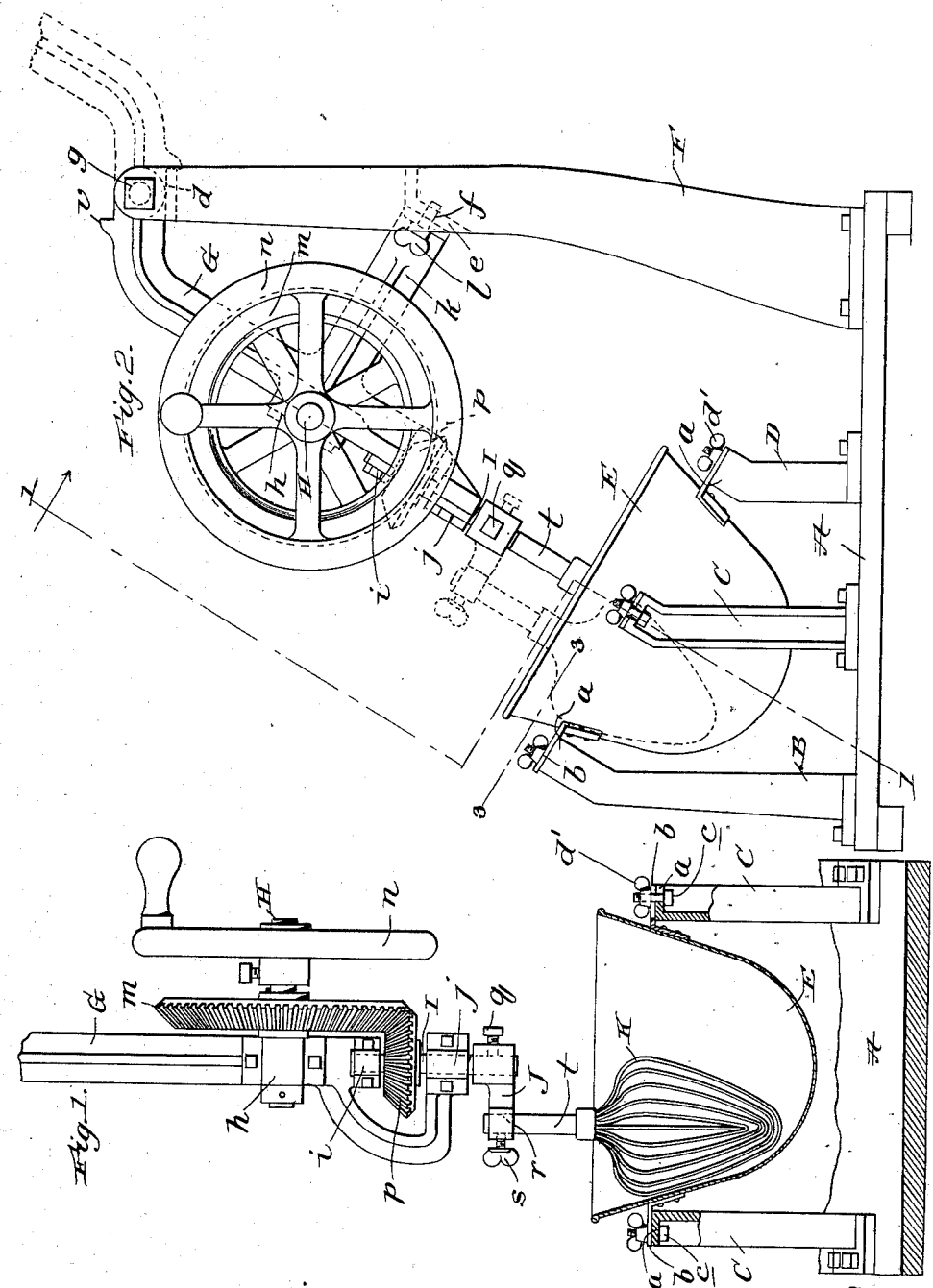

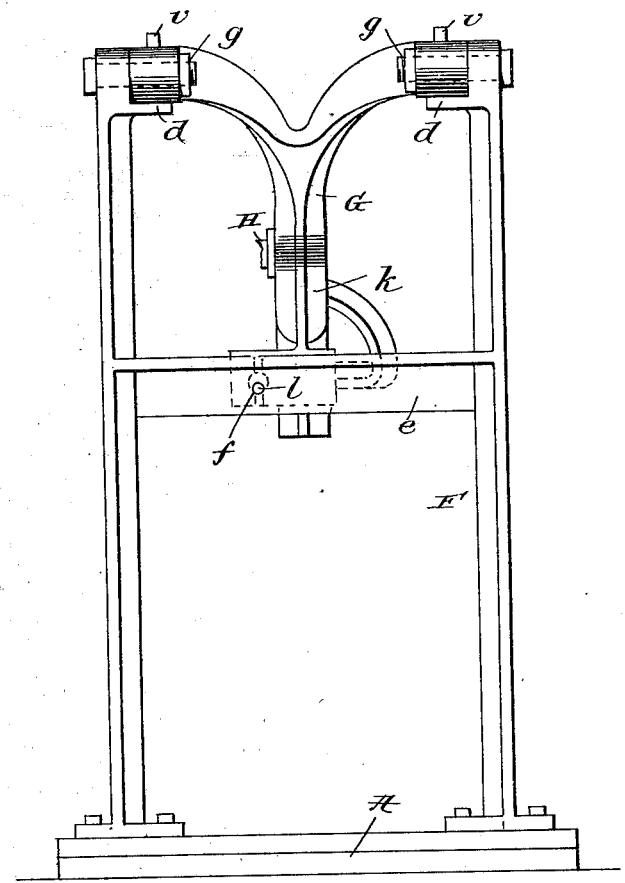

UNITED STATES PATENT OFFICE.

ROBERT AUGUST EIFERT, OF NEW YORK, N. Y.

EGG-BEATER.

SPECIFICATION forming part of Letters Patent No. 735,353, dated August 4, 1903.

Application filed March 24, 1903. Serial No. 149,307. (No model.)

*To all whom it may concern:*

Be it known that I, ROBERT AUGUST EIFERT, a citizen of the United States, residing at New York, in the county of New York and State of New York, have invented new and useful Improvements in Egg-Beaters, of which the following is a specification.

My invention relates to machines for beating the whites of eggs, cream, and the like; and it has for one of its objects to provide such a machine in which a vessel for holding the whites of eggs or the cream and an agitator movable in a circle in the vessel are disposed at an angle of about thirty degrees from the vertical, this being advantageous, since the substance being beaten tends to rest in and return to the lowermost portion of the vessel, and the agitator is enabled to raise such substance to the high side of the vessel and keep it in motion all the time, with the result that the substance is quickly reduced to the desired stiffness.

Another object is to provide a machine for beating the whites of eggs, cream, and the like embodying such a construction that the agitator may be readily withdrawn from the vessel and with its actuating mechanism swung out of the way, and may as readily be replaced in the vessel.

With the foregoing in mind the invention will be fully understood from the following description and claims, when taken in connection with the accompanying drawings, in which—

Figure 1 is a section of the machine constituting the preferred embodiment of my invention, taken on the broken line 1 1 of Fig. 2. Fig. 2 is a side elevation of the machine, with the agitator shown in one position by full lines and in another position by broken lines and also with a portion of the movable frame shown in its upper position by broken lines. Fig. 3 is a detail section taken in the plane indicated by the broken line 3 3 of Fig. 2, and Fig. 4 is a detail elevation taken at right angles to Fig. 2 and illustrating the manner in which the movable frame is connected to the standard or fixed frame of the machine.

Similar letters designate corresponding parts in all of the views of the drawings, referring to which—

A is the base of my improved machine, formed by preference, of wood; B, C C, and D, upright supports of different heights connected to the frame A about a common center and having inclined slotted flanges $a$ at their upper ends; E, a vessel having slotted brackets $b$ on its outer side, arranged on the flanges $a$ and detachably connected thereto by bolts $c$ and wing-nuts $d'$, Fig. 1, whereby said vessel is held at an angle of about thirty degrees from the vertical; F, a standard or fixed frame connected to the base A and having horizontal flanges $d$ adjacent to its upper end and an inclined flange $e$ at an intermediate point of its length provided with a screw-tapped aperture $f$; G, a movable frame pivoted at $g$ to the upper end of the standard, inclined in conformity to the vessel E and having a horizontal journal-box $h$ and inclined journal-boxes $i\,j$, disposed at right angles to the box $h$ and also having an arm $k$, adapted to bear at one end against the flange $e$ and be detachably connected thereto through the medium of a thumb-screw $l$; H, a shaft journaled in the box $h$ of the movable frame and bearing a beveled gear $m$ and also, by preference, a combined balance and crank wheel $n$; I, a shaft journaled in the boxes $i\,j$ of the movable frame and bearing a beveled gear $p$, intermeshed with the gear $m$; J, a crank fixed by a set-screw $q$ on the shaft I and having an aperture $r$ and a thumb-screw $s$ bearing in the wall thereof; and K, an agitator, preferably of wire and spoon-shaped, disposed in the vessel E and having a stem $t$, fastened in the aperture $r$ of crank J by the thumb-screw $s$.

In the practical operation of my improved machine the whites of eggs, cream, or other substance to be beaten is placed in the vessel E and the shaft H is rotated, when, as will be readily observed, the agitator will be moved at a high rate of speed in a circle within the vessel. The arrangement of the vessel E at an angle of about thirty degrees from the vertical causes the substance being beaten to tend to rest in and return to the lowermost portion of the vessel, incident to the operation described, while the correspondingly-inclined agitator, moving in a circle, serves to raise the substance to the high side of the vessel, with the result that the substance is kept in motion all the time and is quickly reduced to the desired stiffness. After the substance is beaten to the required stiffness the thumb-screw s is loosened, the stem of the agitator K is moved upwardly in the aperture r of crank J and fastened in a raised position, and the frame G is swung upwardly and rearwardly until it rests in the position shown by dotted lines in Fig. 2, with a lug v, with which it is provided, bearing against the flange d of standard F. The vessel E is then disconnected and removed from the several supports B, C, and D, discharged of its contents, and cleansed and replaced on and connected to the supports, after which the frame G is returned to the position shown and the agitator K is lowered into the vessel E and secured in its lower position, when the machine is ready for another operation.

When the whites of eggs are to be beaten, a small oil or gas stove may be placed in the space between the supports B, C, and D and under the vessel E, with a view of heating the whites and saving time and labor in the operation, while when cream is to be beaten a pan of ice may be used at the same point to cool the cream and thereby expedite the reduction of the same to the consistency desired.

When my improved machine is to be driven by power, a band-pulley is employed on the shaft H in lieu of the wheel n.

I have entered into a detailed description of the construction and relative arrangement of the parts embraced in the present and preferred embodiment of my invention in order to impart a full, clear, and exact understanding of the same. I do not desire, however, to be understood as confining myself to such specific construction and arrangement of parts, as such changes or modifications may be made in practice as fairly fall within the scope of my invention as claimed.

Having described my invention, what I claim, and desire to secure by Letters Patent, is—

1. In a machine for beating the whites of eggs, cream and the like, the combination of a vessel, fixed at an angle of about thirty degrees from the vertical, a fixed frame, a movable frame pivoted to the said fixed frame, and an agitator inclined at an angle of about thirty degrees from the vertical; said agitator being carried by the movable frame, and adjustable toward and from the pivot thereof, and being arranged and movable in a circle in the vessel.

2. In a machine for beating the whites of eggs, cream and the like, the combination of a base, a fixed frame rising therefrom, a plurality of upright supports, of different heights, connected to the base, and grouped about a common center with the shortest support adjacent to the fixed frame, a vessel mounted on and detachably connected to said supports, whereby it is held at an angle of about thirty degrees from the vertical, a movable frame pivoted to the fixed frame, a shaft journaled in said frame, and arranged at angle of about thirty degrees from the vertical, a crank carried by said shaft, an agitator adjustably connected to the crank, and arranged in the vessel, and means for rotating the shaft.

3. In a machine for beating the whites of eggs, cream and the like, the combination of a base, a fixed frame rising therefrom, and having a flange d at its upper end, and a flange e, at an intermediate point of its length, provided with a threaded aperture, a plurality of upright supports, of different heights, connected to the base, and grouped about a common center with the shortest support adjacent to the fixed frame, a vessel mounted on and detachably connected to said supports, whereby it is held at an angle of about thirty degrees from the vertical, a movable frame pivoted to the fixed frame, and having a lug v, and an arm k, adapted to bear against the flange e, and also having a screw bearing in said arm and adapted to enter the aperture in said flange e, a shaft journaled in the movable frame, at an angle of about thirty degrees from the vertical, and carrying a crank, and a beveled gear, a shaft journaled in the frame, and carrying a beveled gear intermeshed with that on the first-mentioned shaft, and an agitator adjustably connected to the crank of the first-mentioned shaft, and arranged in the vessel.

4. In a machine for the purpose described, the combination of a base, a fixed frame rising therefrom, and having a flange d at its upper end, and a flange e, at an intermediate point of its length, provided with a threaded aperture f, a vessel mounted on and detachably connected to a support rising from the base, a movable frame pivoted to the said fixed frame, and having a lug v, and also having an arm adapted to engage the flange e, and a screw bearing in said arm and adapted to enter the aperture f, and an agitator carried by said frame, and arranged in the vessel.

In testimony whereof I have hereunto set my hand in presence of two subscribing witnesses.

ROBERT AUGUST EIFERT.

Witnesses:
CHARLES SOLTAN,
L. SOLTAN.